United States Patent [19]

Cameron et al.

[11] Patent Number: 4,842,100
[45] Date of Patent: Jun. 27, 1989

[54] LUBRICATION SYSTEM FOR AUTOMOTIVE TRANSMISSION POCKET BEARING

[75] Inventors: Robert W. Cameron, Canton; Gary J. Dressler, Massillon; Jack I. Hartline, North Canton, all of Ohio

[73] Assignee: The Timken Company, Canton, Ohio

[21] Appl. No.: 122,922

[22] Filed: Nov. 19, 1987

Related U.S. Application Data

[63] Continuation of Ser. No. 833,967, Mar. 4, 1986, abandoned.

[51] Int. Cl.[4] .............................................. F01M 9/06
[52] U.S. Cl. .................................. 184/6.2; 184/6.12; 184/11.2
[58] Field of Search ............... 184/13.1, 11.2, 6.12, 184/6.2, 11.1, 11.3, 11.4; 74/467

[56] References Cited

U.S. PATENT DOCUMENTS

| | | | |
|---|---|---|---|
| 2,011,559 | 8/1935 | Boden | 184/13.1 |
| 4,221,279 | 9/1980 | Jones et al. | 184/11.1 |
| 4,227,427 | 10/1980 | Dick | 74/467 |
| 4,317,386 | 3/1982 | Ida et al. | 184/11.1 X |
| 4,327,598 | 5/1982 | Yoneda et al. | 74/467 |
| 4,359,142 | 11/1982 | Schultz et al. | 181/11 R |
| 4,359,909 | 11/1982 | Sogo | 184/6.12 X |

Primary Examiner—Carlton R. Croyle
Assistant Examiner—Leonard P. Walnoha
Attorney, Agent, or Firm—Gravely, Lieder & Woodruff

[57] ABSTRACT

The invention is directed to a transmission assembly comprising: a power output delivery end and a power input end; a pocket bearing operative between the power delivery end and the input end of the transmission; a lubricant containing housing remote from the pocket bearing in the transmission; a lubricant conduit system extending from said housing to said power input end of the transmission; a lubricant pump in said housing responsive to transmission operation for throwing lubricant outwardly under pressure within said housing; and a lubricant collector in said housing in the path of the lubricant thrown out by said pump, said collector directing the lubricant under pressure into said conduit system for delivery into said power input end of the transmission for supplying lubricant under pressure to reach said pocket bearing.

5 Claims, 2 Drawing Sheets

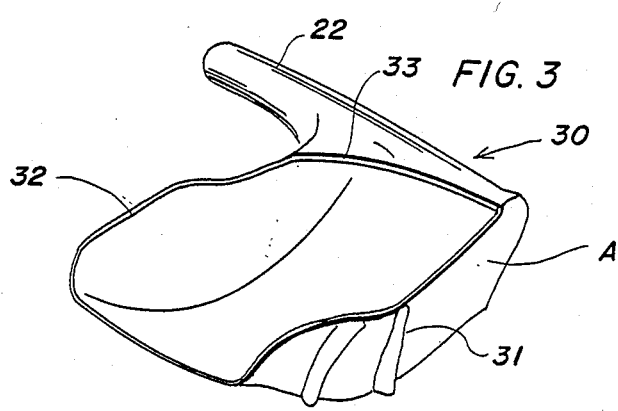
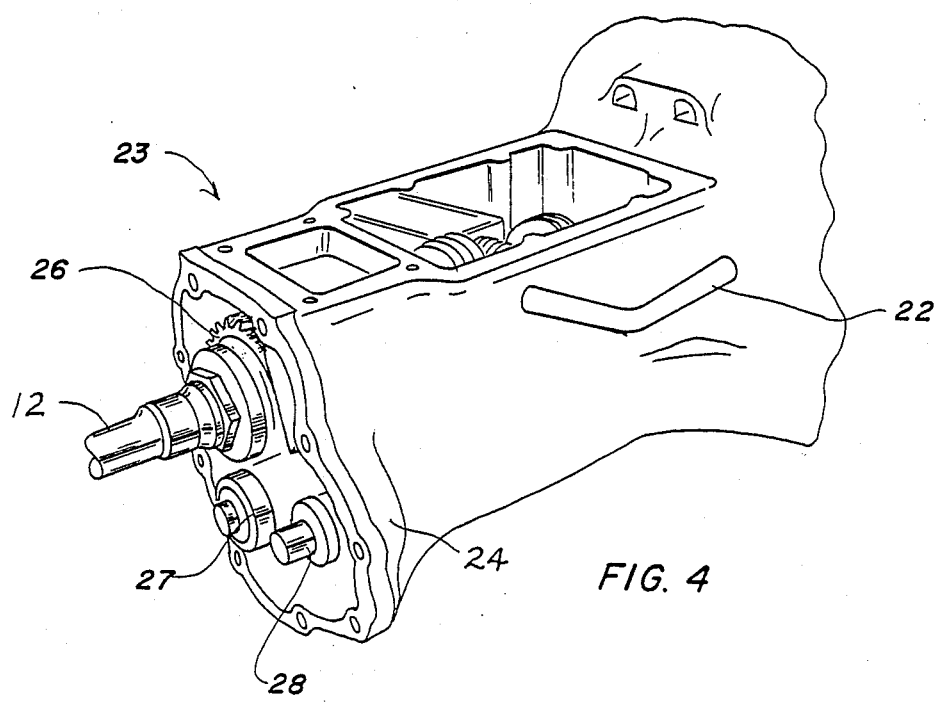

4,842,100

LUBRICATION SYSTEM FOR AUTOMOTIVE TRANSMISSION POCKET BEARING

This is a continuation of application Ser. No. 833,967 filed on Mar. 4, 1986, now abandoned.

BACKGROUND OF THE INVENTION

1. Field of the Invention

This invention is directed to a lubrication system for delivering lubricant to a transmission pocket bearing from a source of lubricant remote from the pocket bearing.

2. Description of the Prior Art

It is known from the prior art to employ gear means to pump a lubricant into a lubricant guiding baffle where the lubricant is then directed from the baffle into a bearing that is not easily lubricated. Such an arrangement is seen in Boden U.S. Pat. No. 2,011,559 of 1935. In the automotive transmission art there is a known system of lubricating a pocket bearing by a lubricant splash collector that allows lubricant to drain into a passage that directs the lubricant into ports that feed a pocket bearing. This prior art arrangement is seen in Jones et al U.S. Pat. No. 4,221,279 of 1980, and in Dick U.S. Pat. No. 4,227,427 of 1980.

The problem of obtaining adequate lubricant for a pocket bearing is magnified by the location of such a bearing in a pocket that is surrounded by structure required to sustain the torque during delivery of power from the engine output shaft to the input shaft of the transmission. Such a bearing is not susceptable of receiving lubricant by splash from the rotating gears because it is shielded by structure. In addition there is the problem of getting lubricant to a forwardly located pocket bearing especially when the vehicle is moving up an incline where the lubricant shifts to the rear, away from the pocket bearing position. Some effort has been made to incorporate a dam to prevent lubricant shift in a transmission when in an inclined position of as much as 20°. The dam, however, is an impositive arrangement for overcoming the absence of pocket bearing lubricant.

BRIEF DESCRIPTION OF THE INVENTION

The problem of adequately lubricating a pocket bearing in an automotive transmission can be substantially solved by collecting lubricant at a suitable location in the transmission and pumping or forceably delivering it to the environment adjacent to a pocket bearing or directly to such a bearing. Such a suitable location for a lubricant supply is quite limited, but it has been determined that a lubricant supply can be obtained from a lubricant retaining housing that encloses a gear cluster at the rear of the transmission so that the gear cluster can operate as a pump to force the lubricant to flow as directed to the pocket bearing.

A preferred embodiment that significantly overcomes the pocket bearing lubricant problem, in the environment of a transmission assembly having a power input receiving end and a power output end, comprises a lubricant retaining housing enveloping the transmission, a gear cluster operative as a lubricant pump, and lubricant collecting and delivery means between the lubricant retaining housing and the pocket bearing for collecting lubricant pumped by the gear cluster and conveying the lubricant under pressure to lubricate the pocket bearing.

More particularly, the lubricant system for an automotive transmission pocket bearing comprises a power delivery output shaft from the engine formed with a drive gear on its output end which surrounds a lubricant collecting cavity, a transmission shaft having its power input end positioned within the drive gear cavity, and the input end of the transmission shaft, the pocket bearing having a cup race in the drive gear, a cone race on the input end of the transmission shaft, and rolling elements between the cup and cone races, and lubricant supply pump means remote from the pocket bearing but in a position in the transmission to collect lubricant and deliver it with sufficient force to supply the drive gear cavity where the lubricant will reach the pocket bearing under all transmission operating conditions.

BRIEF DESCRIPTION OF THE DRAWINGS

A preferred embodiment of the present invention is illustrated in the accompanying drawings wherein:

FIG. 3 is a perspective view of the lubricant collecting means and outlet conduit, the view being taken with the means removed from the environment of FIG. 2; and FIG. 4 is a further fragmentary perspective view of the transmission showing the lubricant conducting means leading from the lubricant collecting means adjacent the gear cluster source to the portion of the transmission seen in FIG. 4 where it is delivered to the pocket bearing.

DETAILED DESCRIPTION OF THE PREFERRED EMBODIMENT

Figure 1:
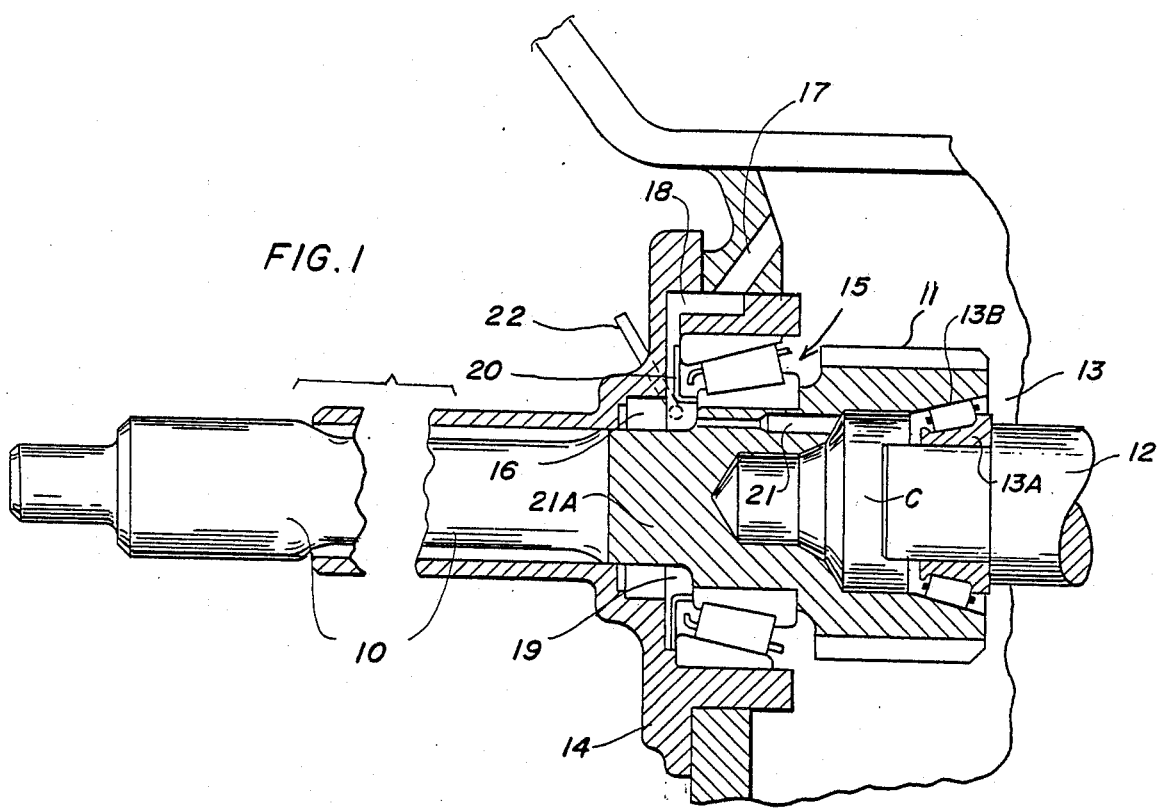
FIG. 1 is a longitudinal sectional view of fragmentary part of the power input end of a typical automotive transmission to reveal the location of a pocket bearing, more of the transmission being seen in FIG. 4.

FIG. 1 is a typical view of the power input end of an automotive transmission in which the power from the engine (not shown) is delivered to the shaft 10. The enlarged end of the shaft 10 forms a drive gear 11 which meshes with a driven gear (not necessary to show but of well known character). The drive gear 11 encloses the power input end of a transmission output shaft 12 which projects into the space in the drive gear 11. The pocket bearing assembly 13 is composed of an inner ring 13A on the shaft 12 and an outer race 13B in the gear 11 on the shaft 10, and between these shafts is a lubricant collecting cavity C. The input shaft adapter 14 is formed with suitable means to accommodate a further bearing assembly 15 for the shaft 10, as well as a seal 16.

In the view of FIG. 1, there is the usual lubricant splash collection port 17 which opens from the interior of input shaft adapter 14 to a lubricant collecting space 18 which directs lubricant into the bearing cavity 19 adjacent other seal means 20 which prevents oil from entering bearing 15. The cavity 19 is in communication by drilled ports 21 with the pocket bearing 13 so that lubricant in the cavity furnishes bearing 13 with lubricant before it exits back to the transmission sump. Lubricant cannot be brought in from the transmission area beyond and to the right of the shaft 12 because of shifting mechanisms, synchronizers and other gears. The problem with this normal arrangement of lubricant for the pocket bearing 13 is that when the transmission is tilted up, as when the vehicle is moved up an incline, some inclines being of 20° or more, the pocket bearing is starved for lubricant at the worst possible operating condition when the torque demands of the drive are greatest.

Figure 2:
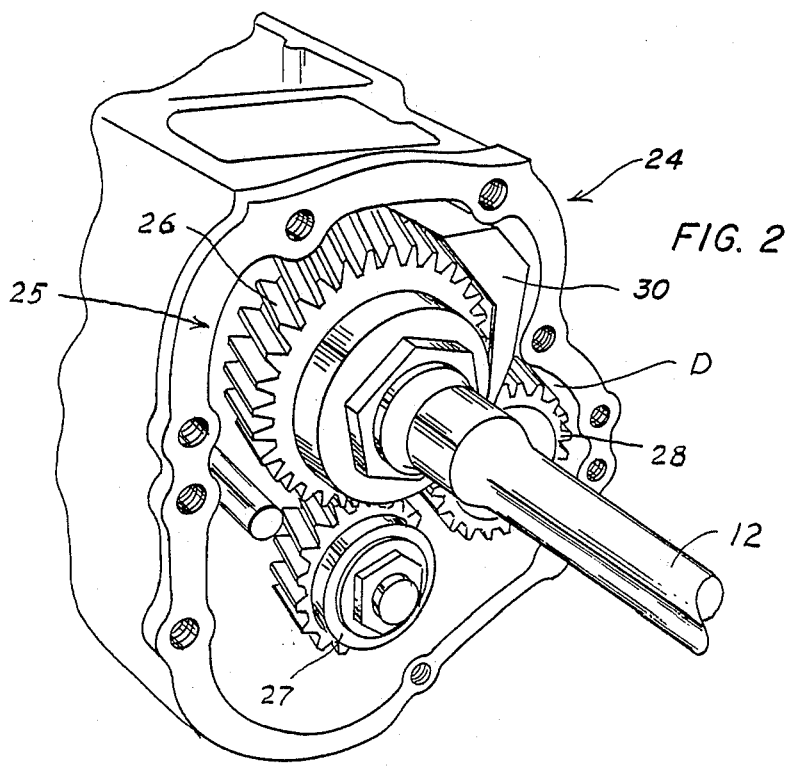
FIG. 2 is a perspective view looking into the left hand end of the transmission seen in FIG. 4 which is the power output end of an automotive transmission with cover structure removed to reveal a gear cluster that operates as a pump to supply an adjacent lubricant collector means.

The preferred embodiment for solving the pocket bearing lubrication problem is seen in FIGS. 2, 3 and 4 where a source of lubricant under pressure or by force feed flow is associated with a conduit 22 connected into the cavity 19. Tracing that conduit 22 back toward the output end of the transmission assembly 23, it can be appreciated that it enters the housing wall in the vicinity of the end housing 24 of the transmission (see FIG. 4).

The details of the lubricant feed system are shown in FIGS. 2, 3 and 4. The transmission housing 23 has the rear end cover removed from a cavity D to show the lubricant pumping means in the nature of a gear cluster 25 in which a main gear 26 connected to the beforementioned output shaft 12 seen in FIG. 2 meshes with satellite gears 27 and 28 for a purpose that is not material to this invention, except to function as a pump and forcefully deliver lubricant into the upper region of the housing cavity D. When the cover is in place on the end 24 of the assembly 23 where lubricant is retained therein regardless of the inclination of the vehicle.

An important member of the lubricating system is seen in FIG. 3, and its position in the system is seen in FIG. 2. That member or collecting baffle is a curved pan 30 having sides 31 and 32 which confine the lubricant and direct it into the entrance end of the conduit 22. Baffle or pan 30 is mounted in the output end 24 of the transmission 23 by any suitable means of fasteners (not shown). The spacing of the baffle sides 31 and 32 is substantially the same as the width of the principal gear 26, and the entrance end of conduit 22 is partially confined by an overhanging lip 33 so that the lubricant thrown upwardly along the curved surface of the pan 30 is turned into the conduit 22 with considerable force and velocity sufficient to cause the lubricant to traverse the conduit 22 and reach the pocket bearing 13.

The present disclosure shows the lubricant conducting conduit 22 to be partially separate from the housing wall of the transmission 23. However, it is understood that the wall may have an internal passage or series of connected passages for delivering lubricant to the pocket bearing. It is seen in FIG. 1 that the cavity C in front of the transmission shaft 12 receives and collects lubricant that will ultimately pass through the pocket bearing 13. When the clutch is engaged the principal pumping gear 26 is constantly rotating so lubricant will be delivered to the baffle 30 and carried by conduit 22 into the cavity C to assure adequate lubricant for the pocket bearing under transmission operating conditions.

In FIG. 1 it can be seen that the usual arrangement of lubricant catch basin 18 is intended to supply the pocket bearing. The problem with that provision is that when the vehicle is moving up an incline or steep grade the lubricant migrates to the rear or away from the passage 17. The incline position is one in which the axis of the shaft 10 is tilted up from the left end. When that happens the gears in the front of the transmission do not dip into the lubricant and nothing reaches the passage 17 so the pocket bearing 13 is starved for lubricant.

The present invention overcomes the problem of the prior provisions and delivers adequate lubricant to the pocket bearing 13 regardless of the position of the vehicle. Thus, there is increased pressure in and flow of lubricant to the pocket bearing in a significant amount. While a preferred embodiment is disclosed, it is understood that equivalent provisions and arrangements of components are to be included as permitted by the prior art.

What is claimed is:

1. In a lubricating system for delivering a lubricant to a pocket bearing adjacent the forward end of an elongated transmission assembly receiving the rearward end of an engine power output shaft, the rearward end of the engine power output shaft being formed with an internal pocket adjacent the forward end of the transmission assembly, a power receiving shaft in the transmission assembly having a forward end projecting into the internal pocket, and bearing means disposed in the internal pocket between the rearward end of the engine output shaft and the power receiving shaft end of the transmission assembly, the improvement of an arrangement for lubricating the bearing means in the internal pocket when the engine output shaft is inclined at least to a position in which the engine is higher than the internal pocket and the bearing means therein, the improvement comprising:
   (a) a lubricant retaining cavity in the rearward end of the elongated transmission assembly, said cavity being separated from the location of the internal pocket enclosing the end of the engine output shaft;
   (b) lubricant transfer means interconnecting the separated lubricant retaining cavity in the rearward end of the transmission assembly with the internal pocket; and
   (c) lubricant pumping means in the lubricant retaining cavity which is operable in response to operation of the transmission assembly to pump lubricant from the lubricant retaining cavity into the lubricant interconnecting means to supply lubricant to the bearing means disposed in the internal pocket under transmission operating conditions.

2. The improvement set forth in claim 1 wherein the lubricant interconnecting means includes a lubricant pickup baffle means in said lubricant retaining cavity to direct the pumped lubricant into the lubricant interconnecting means.

3. A transmission pocket bearing lubricating system in a transmission assembly associated with an engine output shaft comprising:
   (a) a power delivery shaft from an engine having a drive gear thereon formed with an internal cavity;
   (b) a transmission operating shaft having a forward end portion projecting into said internal cavity of said drive gear and said transmission operating shaft having an opposite remote rearward end;
   (c) bearing means operative in said internal cavity between said drive gear and said transmission shaft first said end portion;
   (d) a cavity means in the transmission assembly for retaining a source of lubrication remote from said internal cavity, said cavity means having a connection with said internal cavity; and
   (e) pump means operably disposed in said cavity means at said remote source of lubricant for forcing lubricant to flow to said internal cavity for lubricating said bearing means therein.

4. The transmission pocket bearing lubricating system set forth in claim 3 wherein said pump means includes gear means operating in the cavity means for forcing the lubricant to flow in said connection with said internal cavity.

5. The transmission pocket bearing lubricating system set forth in claim 3 wherein a lubricant directing baffle is mounted in said cavity means in position to receive lubricant forced by said pump means, said directing baffle having an outlet to said connection.

* * * * *

UNITED STATES PATENT AND TRADEMARK OFFICE
CERTIFICATE OF CORRECTION

PATENT NO. : 4,842,100

DATED : June 27, 1989

INVENTOR(S) : Cameron et al.

It is certified that error appears in the above-identified patent and that said Letters Patent is hereby corrected as shown below:

Column 2, line 6 insert after "the drive gear cavity, " the following phrase" a pocket bearing disposed between the drive gear cavity".

Signed and Sealed this

Tenth Day of April, 1990

Attest:

HARRY F. MANBECK, JR.

Attesting Officer

Commissioner of Patents and Trademarks